United States Patent [19]

Madonia

[11] Patent Number: 4,583,878
[45] Date of Patent: Apr. 22, 1986

[54] FRAMING SYSTEM

[76] Inventor: Ciro Madonia, 1470 Mississauga Rd., Mississauga, Canada, L5J 2J8

[21] Appl. No.: 737,670

[22] Filed: May 24, 1985

[51] Int. Cl.$^4$ .............................................. F16B 7/04
[52] U.S. Cl. ...................................... 403/402; 40/155
[58] Field of Search ................. 403/401, 402; 40/155, 40/152

[56] References Cited

FOREIGN PATENT DOCUMENTS

| 2260014 | 8/1975 | France | 403/402 |
| 1402138 | 8/1975 | United Kingdom | 403/402 |

*Primary Examiner*—Andrew V. Kundrat
*Attorney, Agent, or Firm*—D. Eggins

[57] ABSTRACT

A framing system provides an angle joining piece having a pair of leg portions in mutually inclined relation for use with suitably grooved framing members wherein the leg portions are initially entered within the respective grooves and then forced home to engage respective tooth portions in locking engagement with an internal surface of the groove, to substantially preclude withdrawal of the leg portion from its groove. The selected angle is normally 90°, for four sided frames, the legs each having a fulcrum portion and a buttress portion spaced from the tooth portion, to exert load against the tooth portion in securing relation therewith.

3 Claims, 5 Drawing Figures

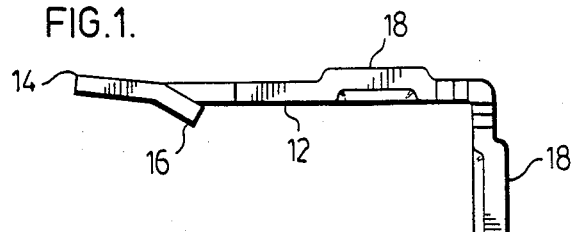
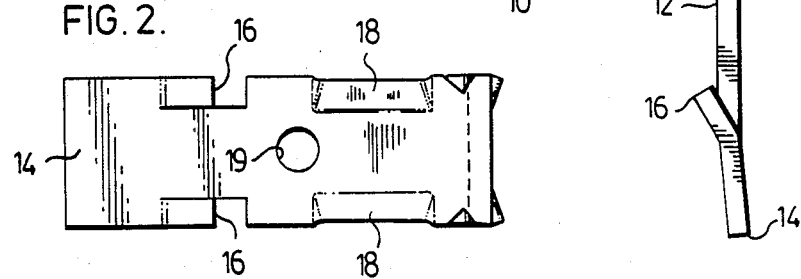
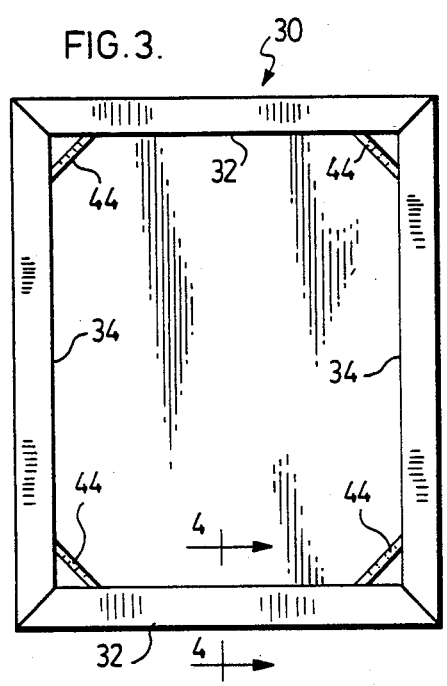
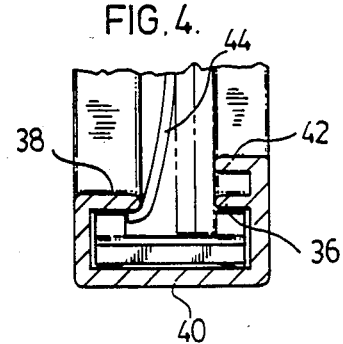
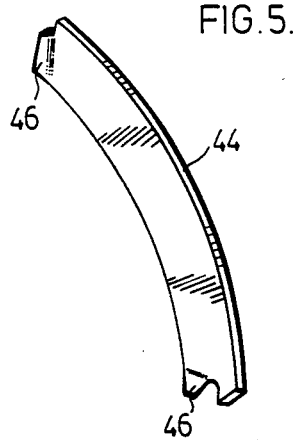

FRAMING SYSTEM

BACKGROUND OF THE INVENTION

This invention is directed to a frame system and in particular to a sectional frame and locking joining angle portions.

The use of extruded frame sections with preformed angle pieces is well known, being used for purposes such as picture frames. Typical of such prior art are the following Canadian Pat. Nos.
881,000 Sept. 14th, 1971 Herbert;
980,116 Dec. 23rd, 1975 Cournoyer;
1,041,762 Nov. 7th, 1978 Kapstad;
1,066,505 Nov. 20th, 1979 Schwartz.

Certain of the angle pieces include the provision of locking means. However, the prior art joiners, while providing a certain degree of retentive capability, do not afford a permanent lock of the components inherent with the insertion of the joiner.

SUMMARY OF THE INVENTION

In accordance with the present invention there is provided a frame system incorporating a permanent locking capability of the corner angle coincident with the assembly of the components.

The disclosed embodiment of the frame portion comprises a simple extruded section having an inner, assembly groove, together with a shallow outer lip to receive the picture and picture backing components in retained relation.

The presently disclosed angle locking piece comprises a pair of leg portions in mutually inclined relation at a predetermined angle for use in joining a pair of frame section members in secured angular relation with each other by insertion of the leg portions within grooved portions of the sections, each leg portion having a fulcrum portion for contacting a surface of the grooved portion, a tooth portion projecting from the leg portion and spaced longitudinally from the fulcrum portion, and leg locating means spaced longitudinally from the fulcrum portion and the tooth portion for making contact with the section groove upon forced insertion therein to apply a resilient bending moment against the tooth portion, to force it into engaging relation with the section.

The leg locating means is positioned adjacent the juncture of the leg portions, on the outer surfaces thereof, and comprises a raised pad portion extending along an edge portion on opposite sides of each leg.

BRIEF DESCRIPTION OF THE DRAWINGS

Certain embodiments of the invention are described, reference being made to the accompanying drawings, wherein;

FIG. 1 is a side view of one embodiment of an angle joining piece in accordance with the present invention;
FIG. 2 is a plan view of the angle piece of FIG. 1;
FIG. 3 is a view of a frame incorporating the subject angle joining piece;
FIG. 4 is a view taken at 4—4 of FIG. 3 and
FIG. 5 is a general view of a spring clip.

BRIEF DESCRIPTION OF THE DRAWINGS

Turning to FIGS. 1 and 2 the angle joining piece 10 comprises a pair of legs 12 stamped from stiff sheet metal, and inclined at substantially 90° to each other. Each of the legs 12 has a raised nose portion 14 constituting a fulcrum means. A pair of tooth portions 16 inclined rearwardly of the nose portion 14 extend into the angle formed by the legs 12. A pair of raised pad portions 18 formed by upsetting edge portions of the leg 12 constitute leg spacing means. An aperture 19 extends through each leg 12.

Referring to a typical frame 30 as illustrated in FIG. 3, there are four side pieces 32,34, having the bevelled corners joined by joining pieces 10.

The side pieces are provided with rib portions 36, 38 in opposed relation forming with the back portion 40 a slot within which a leg 12 may be inserted. In operation the portions of the leg 10 are so dimensioned in relation to the size of the slot section as to be readily insertable therein, having the raised nose portion 14 in contacting relation with the bottom surface 40 of the slot and the tooth portions 16 in contacting relation with the undersurfaces of rib portions 36,38. Upon forcing the leg 12 fully home within the section, the spacing pad means 18 cause transverse displacement of the leg 12, pivoting about the nose portion 14 so as to force the edges of tooth portions 16 into biting engagement with the rib portions 36,38. Removal of the leg 12 from the section may now be effected at this juncture by use of force.

Upon assembly of four lengths of frame 32,34 the rib portions 42 form a front aperture, while the rib portions 38 form a larger, rear aperture.

Insertion of a sheet of glass or plastic dimensioned to enter the rear aperture and to be contained by the front aperture is followed by the insertion of the picture being framed and a backing sheet, such as cardboard. The assembly is completed by spring clips 44 spanning two or more of the frame corners and pressing against the rear outer surface of the backing sheet, the curved ends 46 of the clips 44 being engaged with the ribs 38 of the frame.

What I claim by Letters Patent of the United States is:

1. An angle joining piece having a pair of leg portions in mutually inclined relation at a predetermined angle, for use in joining a pair of frame section members in secured angular relation with each other by insertion of said leg portions within suitably grooved portions of the sections, said leg portions each having a fulcrum portion raised from a first face surface of said leg portion for contacting a surface of said frame grooved portion, a tooth portion projecting from the opposite face of said leg portion and spaced longitudinally from said fulcrum portion, and leg locating means projecting from said first surface and spaced from said fulcrum portion and said tooth portion, for making contact with said frame section groove upon forced insertion therein so as to apply a resilient bending moment about said fulcrum portion against said tooth portion, to force said tooth portion into engaging relation with said frame section, to substantially preclude withdrawal of said joining piece from said section.

2. The joining piece as set forth in claim 1, said leg portions each having a raised nose portion comprising said fulcrum portion, said tooth portion having an edge portion thereof extending from the plane of said leg portion oppositely of said nose portion, pad means projecting from the surface of said leg oppositely of said tooth portion in use to contact an inner surface portion of said frame member groove, to apply said bending moment on said leg portion and forcing said tooth portions into engaging relation with a surface portion of said frame member bounding said groove to substantially preclude withdrawal of said leg from without said goove.

3. The angle joining piece as set forth in claim 1, in combination with a plurality of like joining pieces and an equal number of frame section members, to provide members, of a complete frame.

* * * * *